United States Patent [19]

Fujita et al.

[11] Patent Number: 4,659,106
[45] Date of Patent: Apr. 21, 1987

[54] SUSPENSION APPARATUS FOR VEHICLE

[75] Inventors: Haruyasu Fujita, Tokyo; Kenji Honma; Masao Ogawa, both of Shiki, all of Japan

[73] Assignee: Honda Giken Kogyo Kabushiki Kaisha, Tokyo, Japan

[21] Appl. No.: 702,209

[22] Filed: Feb. 15, 1985

[30] Foreign Application Priority Data

Feb. 25, 1984 [JP] Japan .................................. 59-33337

[51] Int. Cl.$^4$ .............................................. B62D 9/02
[52] U.S. Cl. ................................ 280/772; 280/112 A; 280/710
[58] Field of Search ............... 280/772, 709, 710, 714, 280/112 A; 180/144; 251/304, 309; 137/625.22, 625.23, 625.24

[56] References Cited

U.S. PATENT DOCUMENTS

| | | | |
|---|---|---|---|
| 782,954 | 2/1905 | Elliott | 137/625.24 |
| 1,084,740 | 1/1914 | Holzwarth | 137/625.23 |
| 2,247,749 | 7/1941 | De Venel | 280/707 |
| 2,650,108 | 8/1953 | Bruce | 280/112 A |
| 2,905,430 | 9/1954 | Deist | 280/714 |
| 2,996,309 | 8/1961 | Nallinger | 280/112 A |
| 3,129,644 | 4/1964 | Anderson | 137/625.23 |
| 3,222,867 | 12/1965 | Gauldie | 137/625.24 |
| 3,820,809 | 6/1974 | Blonar | 280/772 |
| 3,820,812 | 6/1974 | Stubbs | 280/709 |
| 4,345,661 | 8/1982 | Nishikawa | 280/112 A |

FOREIGN PATENT DOCUMENTS 2097730  11/1982  United Kingdom ............... 280/772

Primary Examiner—John J. Love
Assistant Examiner—Karin L. Ferriter
Attorney, Agent, or Firm—Armstrong, Nikaido, Marmelstein & Kubovcik

[57] ABSTRACT

Telescopic members which are expanded and contracted by means of a fluid pressure controlled by a steering mechanism are integrally connected to suspension springs. And when a vehicle makes a turn, the body is caused to decline toward the turning center side due to the telescopic movement of the telescopic members according to the steering operation. The fluid pressure may be fed from a hydraulic cylinder including a piston associated for movement with the steering mechanism. Alternatively, fluid pressurized by a pump may be fed through a controlling valve which is actuated in response to the steering mechanism. At a time when the vehicle makes a turn, a satisfactory steering sense similar to a motorcycle can be obtained.

2 Claims, 10 Drawing Figures

4,659,106

SUSPENSION APPARATUS FOR VEHICLE

BACKGROUND OF THE INVENTION

This invention relates to a suspension apparatus for a vehicle such as an automobile or a motor tricycle which is equipped with at least one unit of a pair of right and left wheels.

In a vehicle which is equipped with such a pair of right and left wheels, the body is tended to decline outwardly or to the other side of the turning center of the vehicle when it turns, due to centrifugal force. On the other hand, in a motorcycle, the turn is made while declining its body inwardly. In other words, the motorcycle makes a turn in its lean state. The present invention intends to decline a body of an automobile or a motor tricycle toward the turning center side while it turns, so that a driver of the automobile or the motor tricycle can enjoy the same sort of driving sense or feeling as that of the motorcycle.

One example of such a motor tricycle which can decline its body toward the turning center side when it turns is disclosed in Japanese Laid-Open Patent Publication (Kokai Tokkyo Koho) No. sho 54-25033. This motor tricycle has a pair of right and left front wheels and one rear wheel. The tricycle is designed as such that when it turns, a driver shifts his weight toward the turning center side resisting the centrifugal force in order to decline the vehicle body toward the turning center side. Since this motor tricycle is of a saddle type just as same as a common motorcycle, the driver can comparatively easily shift his weight to decline the vehicle body as described above. However, in the case of a common automobile where the driver sits on a seat, it is not necessarily an easy job for him to decline the vehicle body by shifting his weight.

SUMMARY OF THE INVENTION

It is therefore an object of the present invention to provide a suspension apparatus for a vehicle, wherein the vehicle body can be automatically declined toward the turning center side by means of steering operation and without the driver's intended shifting of his weight to that direction irrespective of whether the vehicle is of said saddle type or seat type.

Another object of the present invention is to provide a suspension apparatus for a vehicle, wherein the entire length of a suspension spring is changed by expanding and contracting a telescopic member provided integrally with said suspension spring thereby causing to decline a vehicle body.

A further object of the present invention is to provide a suspension apparatus for a vehicle, wherein said telescopic member is expanded and contracted by means of a fluid pressure regulated by a steering mechanism.

In order to obtain the above objects, in a suspension apparatus according to the present invention, a telescopic member expanded and contracted by means of a fluid pressure regulated by a steering mechanism is provided integrally with a suspension spring and when a vehicle makes a turn, said telescopic member is expanded and contracted according to steering operation thereby causing to decline a vehicle body in the turning center side.

Said fluid pressure may be supplied to said telescopic member from a hydraulic cylinder including a piston associated for movement with said steering mechanism. Alternatively, a fluid pressurized by a pump driven by an engine may be supplied to said telescopic member through a controlling valve which operates in response to said steering mechanism.

According to the present invention, when the vehicle makes a turn, a driver can enjoy a similar steering operation sense or feeling as that of a motorcycle.

These and other objects and features of the present invention will become apparent to those skilled in the art upon reading the following detailed description with reference to the accompanying drawings in which:

DETAILED DESCRIPTION OF THE EMBODIMENTS

Preferred embodiments of the present invention will be described hereunder with reference to the accompanying drawings in which the invention is applied to a motor tricycle having a pair of front wheels and one rear wheel.

Figure 1:
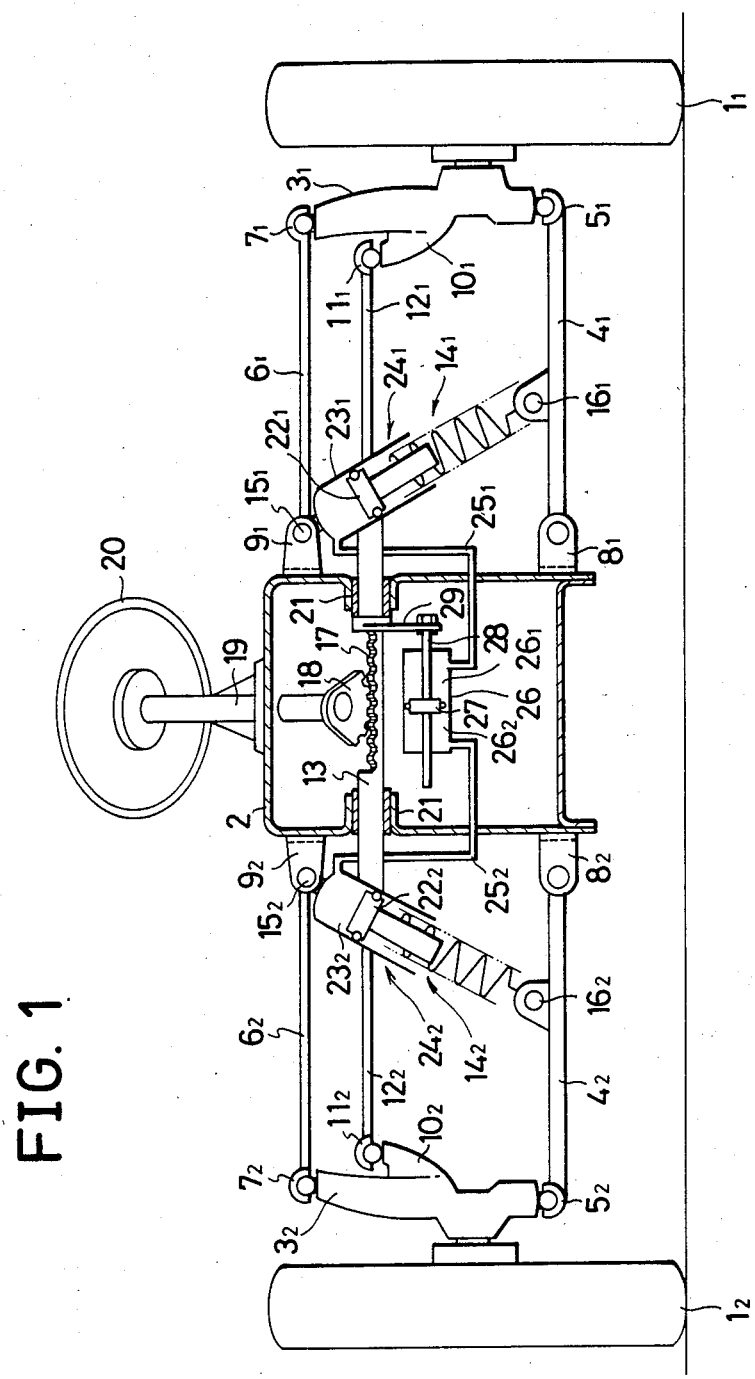
FIG. 1 is a front view showing one embodiment of the present invention at a time when a vehicle is running straight forward.
Figure 2:
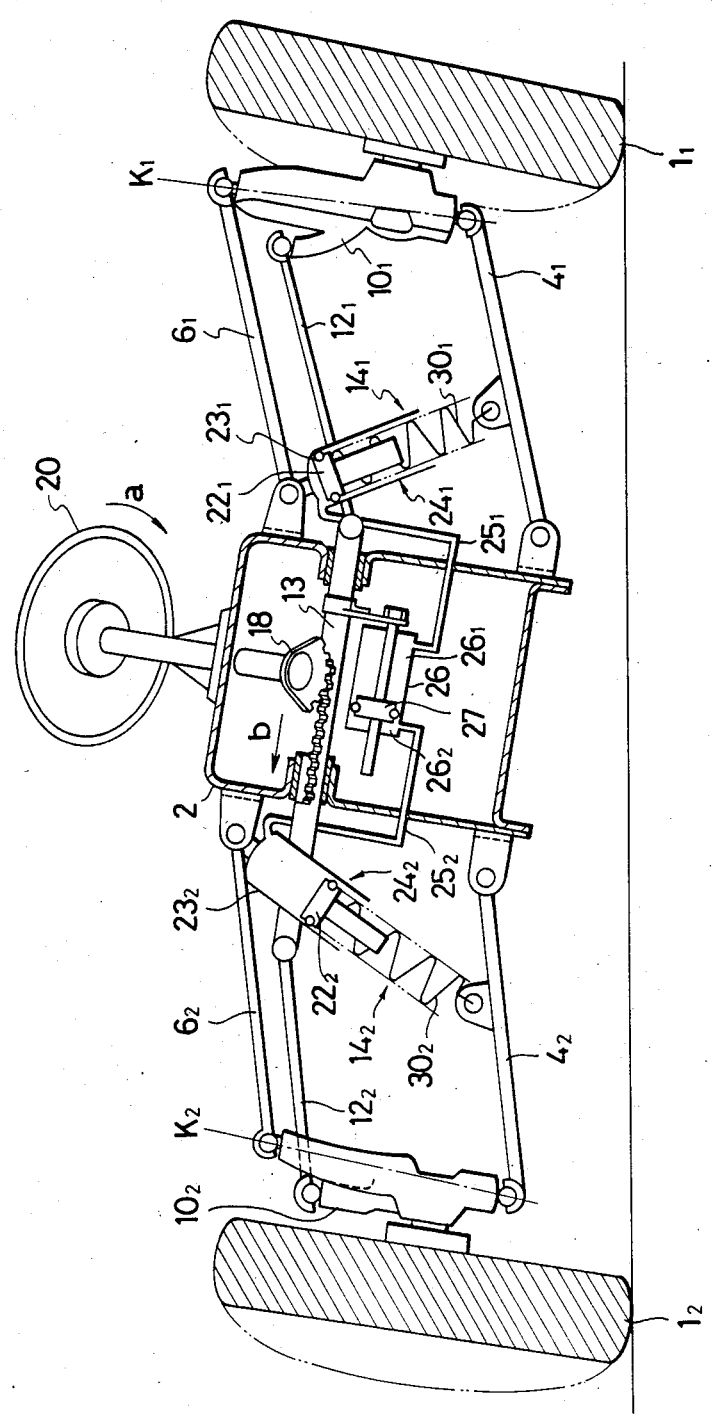
FIG. 2 is a front view of the same embodiment but showing when the vehicle is making a turn.

FIG. 1 and FIG. 2 illustrate a first embodiment of the present invention. More specifically, FIG. 1 is a front view of a suspension apparatus at a time when a vehicle is running straight forward, and FIG. 2 is a front view of the same but showing when the vehicle is turning leftward. The expression "right" or "left" as used herein means right or left when viewed from a driver. $1_1$ denotes a left front wheel, $1_2$ denotes a right front wheel, and 2 denotes a body of a motor tricycle. Said left and right front wheels $1_1$, $1_2$ are integrally provided with knuckles $3_1$, $3_2$ respectively, to the lower ends of which lower arms $4_1$, $4_2$ are connected through ball joints $5_1$, $5_2$ respectively. While, the upper ends of said knuckles $3_1$, $3_2$ are connected with upper arms $6_1$, $6_2$ through ball joints $7_1$, $7_2$ respectively. The other ends of the lower arms $4_1$, $4_2$ are pivotally connected to the body 2 through brackets $8_1$, $8_2$ and the other ends of the upper arms $6_1$, $6_2$ are pivotally connected to the body 2 through brackets $9_1$, $9_2$. With the foregoing arrangement, the so-called double wishbone type suspension is constituted.

Said knuckles $3_1$, $3_2$ are provided with knuckle arms $10_1$, $10_2$ projecting diagonally backward therefrom. The knuckles arms $10_1$, $10_2$ are connected with tie rods $12_1$, $12_2$ through ball joints $11_1$, $11_2$. The other ends of said tie rods $12_1$, $12_2$ are pivotally connected to both ends of slider 13 respectively. Said slider 13 is slidably supported on the body 2 through a bearing 21. Said slider 13 is provided at its central portion with a rack 17, with which a pinion 18 mounted on a steering shaft 19 meshes. 20 denotes a steering wheel.

$14_1$, $14_2$ denote left and right suspension springs respectively. These suspension springs $14_1$, $14_2$ are provided at the upper portions thereof with hydraulic operated telescopic members $24_1$, $24_2$ comprising a piston 22 and a cylinder 23. The upper ends of said suspension springs $14_1$, $14_2$ are secured to the body 2 through pivots $15_1$, $15_2$ and said brackets $9_1$, $9_2$, while the lower ends of said suspension springs $14_1$, $14_2$ are secured to the intermediate portions of said lower arms $4_1$, $4_2$ through pivots $16_1$, $16_2$.

Cylinders $23_1$, $23_2$ of said telescopic members $24_1$, $24_2$ are communicated with cylinder chambers $26_1$, $26_2$ of a hydraulic cylinder 26 through hydraulic pipe lines $25_1$, $25_2$, respectively. Within said hydraulic cylinder 26, a hydraulic piston 27 adapted to partition said cylinder chambers $26_1$, $26_2$ is reciprocally movably provided. A piston shaft 28 of said hydraulic piston 27 is connected to said slider 13 through an arm member 29. And the insides of said cylinder 23, hydraulic pipe 25 and hydraulic cylinder 26 are filled with oil.

When the vehicle runs straight forward, the pinion 18 meshes with the rack 17 at the central position thereof as shown in FIG. 1. However, when the vehicle is going to make, for example, a left turn, the steering wheel 20 is turned towards the counterclockwise direction as viewed by a driver and shown by an arrow a in FIG. 2. Then, due to the rotation of said pinion 18, the slider 13 slides rightward, as viewed from the front and as shown by an arrow b. Since the hydraulic piston 27 is also moved rightward within the hydraulic cylinder 26 in accordance with the movement of said slider 13, the oil within the cylinder chamber $26_2$ is sent to the cylinder $23_2$ through the hydraulic pipe line $25_2$ and the oil is flowed into the cylinder chamber $26_1$ from the cylinder $23_1$ through the hydraulic pipe line $25_1$. Since coil springs $30_1$, $30_2$ of the suspension springs $14_1$, $14_2$ are high in rigidity and practically have little elasticity, the cylinder $23_2$ is moved upward by means of hydraulic pressure acted between the cylinder $23_2$ and the piston $22_2$ (i.e., the telescopic member $24_2$ is expanded), the entire length of the suspension spring $14_2$ becomes long. On the other hand, the entire length of the suspension spring $14_1$ becomes short, since the cylinder $23_1$ moves downward, i.e., the telescopic member $24_1$ is contracted.

As a result, the suspension spring $14_2$ pushes the lower arm $4_2$ down relative to the body 2, while the suspension spring $14_1$ pulls the lower arm $4_1$ relative to the body 2. At this moment, said upper arms $6_1$, $6_2$ follow the movement of said lower arms $4_1$, $4_2$. However, since the wheels $1_2$, $1_1$ normally contact the earth, when the respective members are moved in such a manner as described in the foregoing, the body 2 is finally caused to decline leftward or to the turning center side (the front wheels $1_1$, $1_2$ are also caused to decline) as shown in FIG. 2. Thus, the vehicle turns in the lean state as in the case with the motorcycle.

In connection with the above description, it should be noted that since the both ends of said slider 13 are connected to said knuckle arms $10_1$, $10_2$ through said tie rods $12_1$, $12_2$ respectively, according to the movement of the slider 13, the respective knuckles $3_1$, $3_2$ rotate about king pin axes $K_1$, $K_2$, and as soon as the body 2 starts declining as mentioned above, the respective front wheels $1_1$, $1_1$ are steered.

Although the left turn is described in detail in the above, the right turn is also effected in the same manner.

Figure 3:
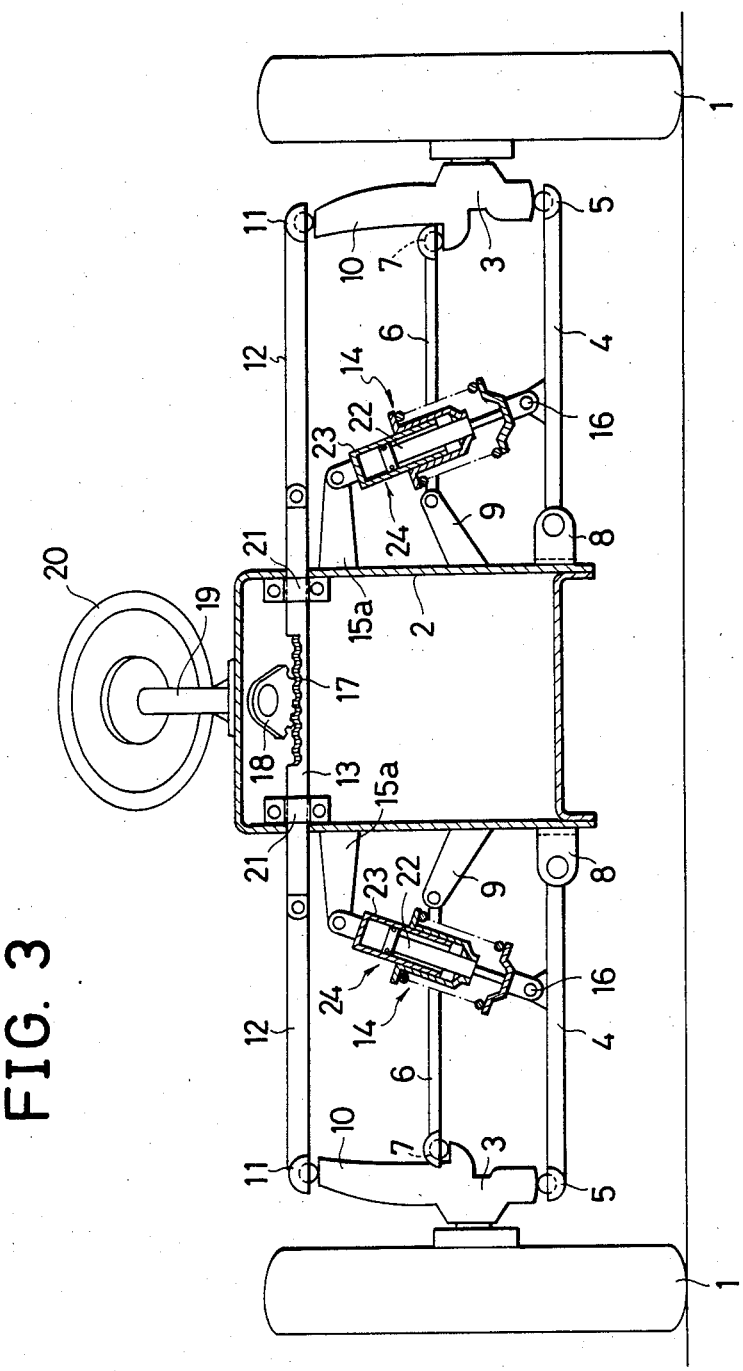
FIG. 3 is a front view showing another embodiment of the present invention at a time when the vehicle is running straight forward but in which a hydraulic system is not shown.

FIG. 3 through FIG. 10 illustrate a second embodiment of the present invention. In these figures, like or corresponding parts with respect to the above mentioned first embodiment are denoted by like numerals. In this embodiment, a hydraulic system adapted to charge and discharge oil into or from a cylinder 23 is different from that of the above described first embodiment. However, there are no other substantial differences between the two (though, the hydraulic system is not shown), as readily understood when compared with FIG. 3 and FIG. 1. Only minor differences in FIG. 3 are that the upper arm 6 is provided beneath and the tie rod 12 is provided above, and that the suspension spring 14 is connected to a bracket 15a other than a bracket 9.

Figure 4:
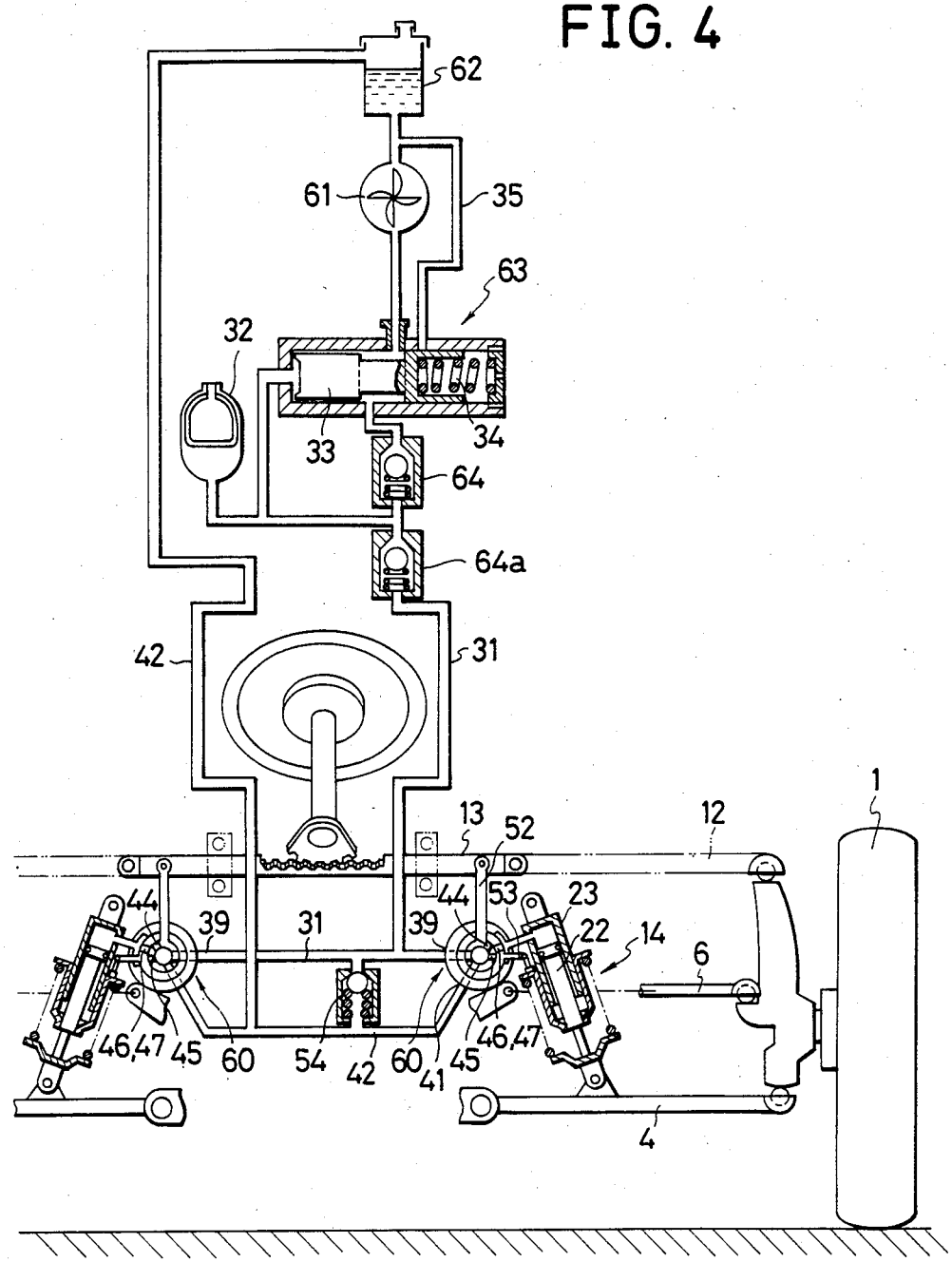
FIG. 4 is a front view of the hydraulic system of the above embodiment at a time when the vehicle is running straight forward.
Figure 5:
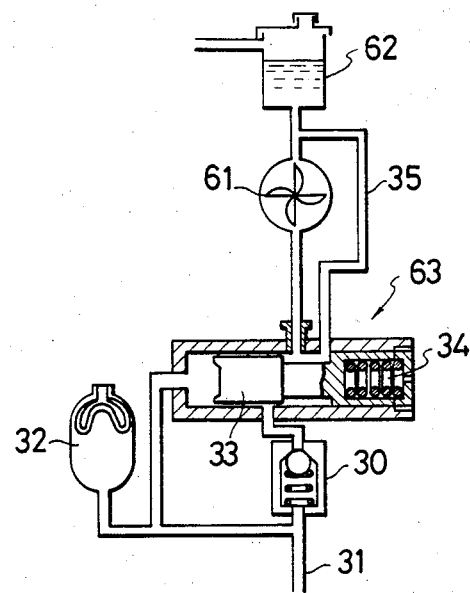
FIG. 5 is a view showing a part of the hydraulic system at a certain time.

FIG. 4 illustrates a hydraulic system employed in this embodiment. The oil charging into the cylinder 23 and the oil discharging therefrom is controlled by means of a controlling valve, or a rotary valve 60 which is actuated in response to the movement of a slider 13. Oil pressurized by a pump 61 is charged into this rotary valve 60. The pump 61 is driven by engine of a vehicle. When the engine is started, oil in a reservoir tank 62 is sent into a feed pipe 31 by the pump 61 through a cut-off valve 63 and a one way valve 64, and reaches said rotary valve 60. Also a part of the oil is sent into an accumulator 32 and stored therein. When the pressure within the feed pipe 31 is reached a preset value, a piston 33 of the cut-off valve 63 is moved rightward in the figure resisting a spring 34 in order to isolate the feed pipe 31 from the pump 61, as shown in FIG. 5. At the same time, oil discharged from said pump 61 is circulated toward an intake side via a by-pass pipe 35. The one way valve 64a (FIG. 4) provided on the feed pipe 31 serves to prevent the pressure generated at the suspension side from escaping into the accumulator 32.

Figure 8:
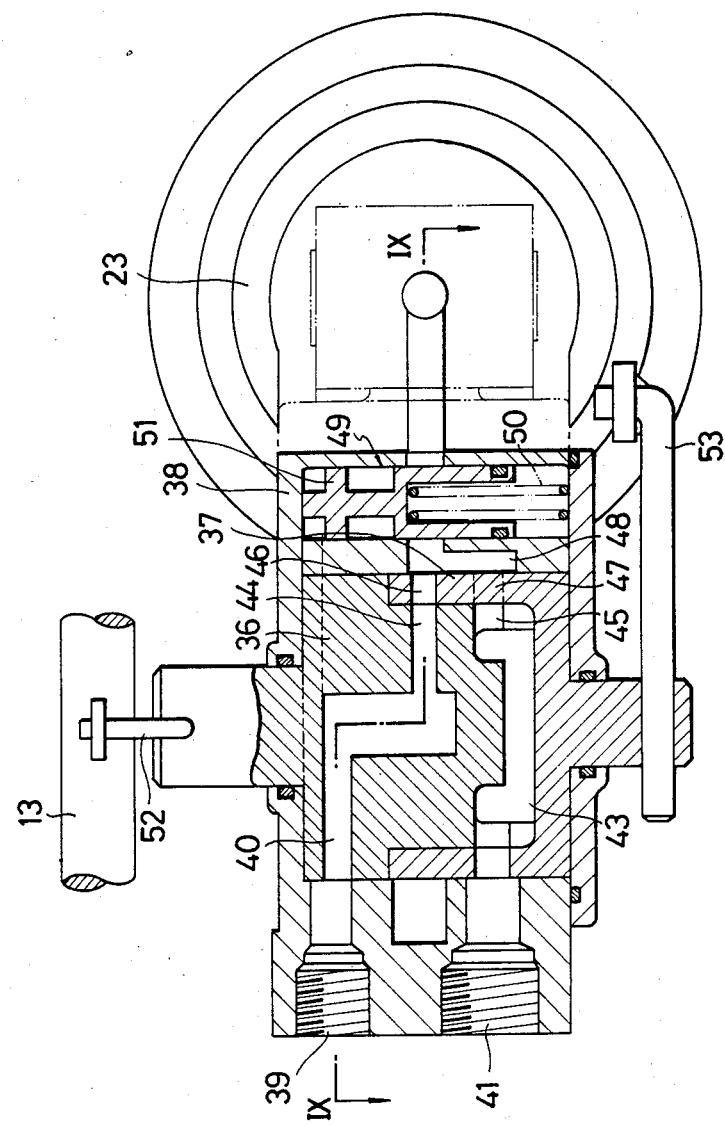
FIG. 8 is a horizontal sectional view of a controlling valve.
Figure 9:
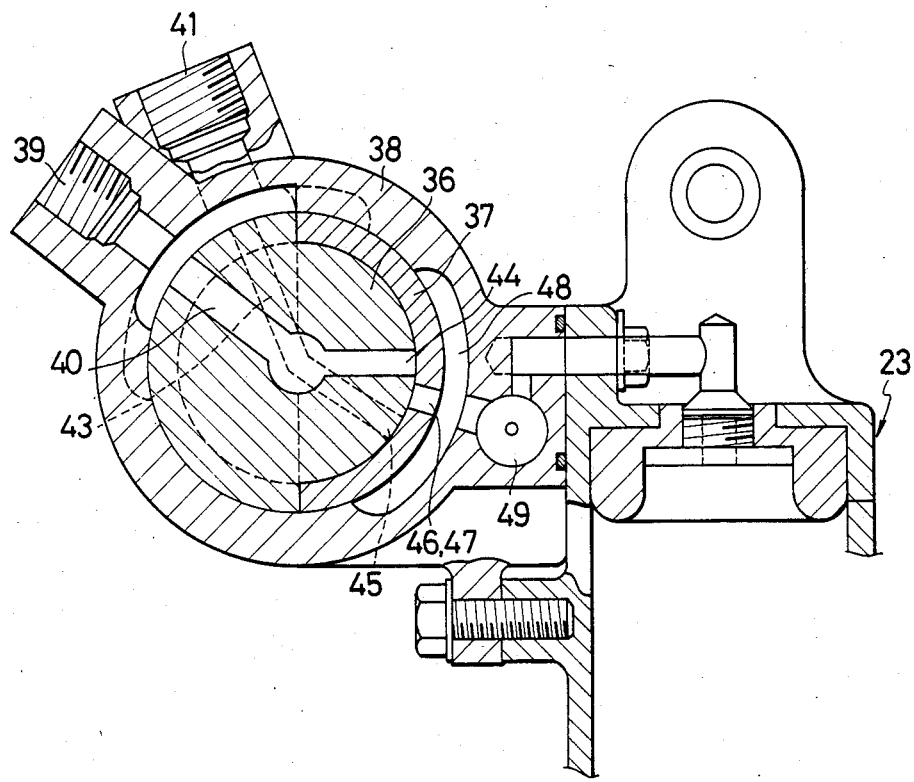
FIG. 9 is a sectional view taken along line IX—IX of FIG. 8.

As illustrated in FIG. 8 and FIG. 9, the rotary valve 60 comprises a cylindrical inner valve member 36, a cylindrical outer valve member 37 contacted with the outer periphery of said inner valve 36 and rotatably fitted thereto relative to each other, and a main body containing and supporting said valves 36 and 37 therein for rotation. Said inner valve 36 is provided with a feed oil passage 40 communicating with said feed pipe 31 through an inlet port 39 and a waste oil passage 43 communicating with a return 42 (refer to FIG. 4) through an outlet port 41. Feed oil passage 40 and waste oil passage 43 are, as apparent from FIG. 8 and FIG. 9, communicated with a feed oil port 44 and a waste oil port 45, respectively, which are opened up in the periphery of said inner valve 36 by displacing in the circumferential direction and the axial direction with respect to each other.

Said outer valve 37 is formed with a feed oil hole 46 and a waste oil hole 47 in positions in agreement with said feed oil port 44 and said waste oil port 45, respectively, in the axial direction. Holes 46 and 47 are arranged on the same line perpendicular to the paper surface of FIG. 9. Upper portion of FIG. 8 is shown as a section cut off along the oil passage 40, while lower portion of FIG. 8 is shown as a section along the oil passage 43. The dotted line at the top of inner valve 36 in FIG. 8 indicates an oil passage to the piston 51. The main body 38 is provided with a oil passage 48 confronting said oil hole 46 and said waste oil hole 47. Said oil passage 48 is communicated with the cylinder 23 of said telescopic member 24 through a cut-off valve 49.

Said cut-off valve 49 includes a piston 51 biased by means of a spring 50. When the engine is stopped and no hydraulic pressure exists within the feed pipe 31, said cut-off valve 49 serves, as shown in FIG. 8, to isolate the oil passage 48 from the cylinder 23 in order to prevent the oil from escaping from the cylinder 23 and thereby to prevent the body 2 from sinking. When the engine is started and the oil pressure is generated within the feed pipe 31, owing to the hydraulic pressure, the piston 51 compresses the spring 50 for distortion and allows the oil passage 48 to communicate with the cylinder 23.

As shown in FIG. 4 and in FIG. 10 as will be described hereinafter, the inner valve 36 is connected to a slider 13 through a lever portion piece 52 and rotated in accordance with the reciprocal movement of said slider 13. On the other hand, the outer valve 37 is connected to a piston 22 side of said telescopic member 24 through a lever portion piece 53 and rotated relative to said inner valve 36 in accordance with the movement of said piston 22 (movement relative to the vehicle body. This definition remains unchanged when used hereinafter) and conducts a feed back operation.

The return pipe 42 connected to said outlet port 41 of the rotary valve 60 is further connected, as shown in FIG. 4, to a reservoir tank 62. Intermediate the feed pipe 31 and the return pipe 42 provided is a safety valve 54 adapted to release oil within the feed pipe 31 to the reservoir tank 62. FIG. 4 illustrates a state similar to FIG. 1 when the vehicle is running straight forward. The rotary valve 60 is in its neutral position wherein the feed hole 46 and the waste oil hole 47 of the outer valve 37 are positioned intermediate the feed oil port 44 and the waste oil port 45 of the inner valve 36 in the circumferential direction. The afore-mentioned FIG. 9 also illustrates such a neutral state as just mentioned before.

Figure 6:
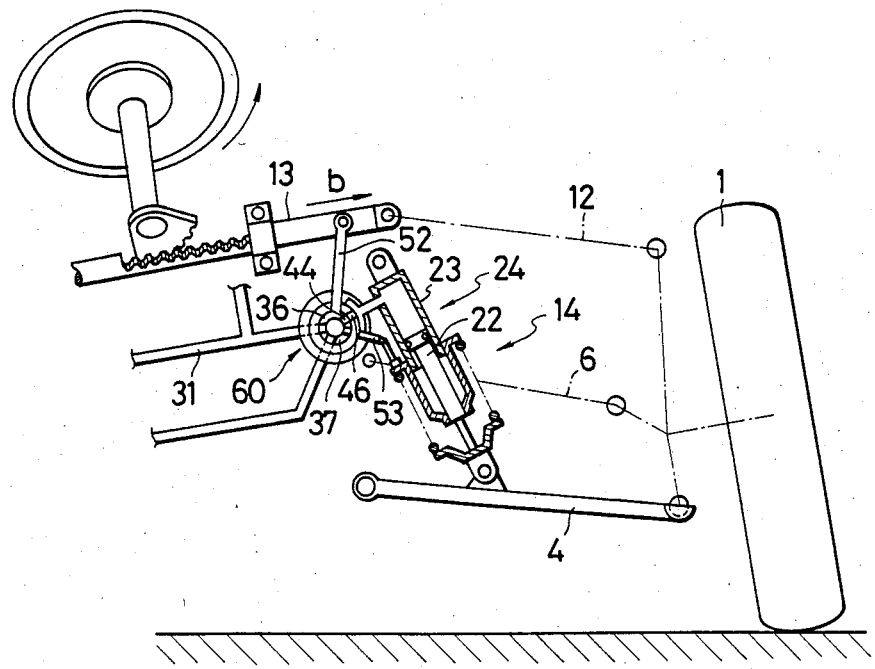
FIG. 6 and FIG. 7 are views showing a part of the hydraulic system at a time when the vehicle makes a turn.
Figure 7:
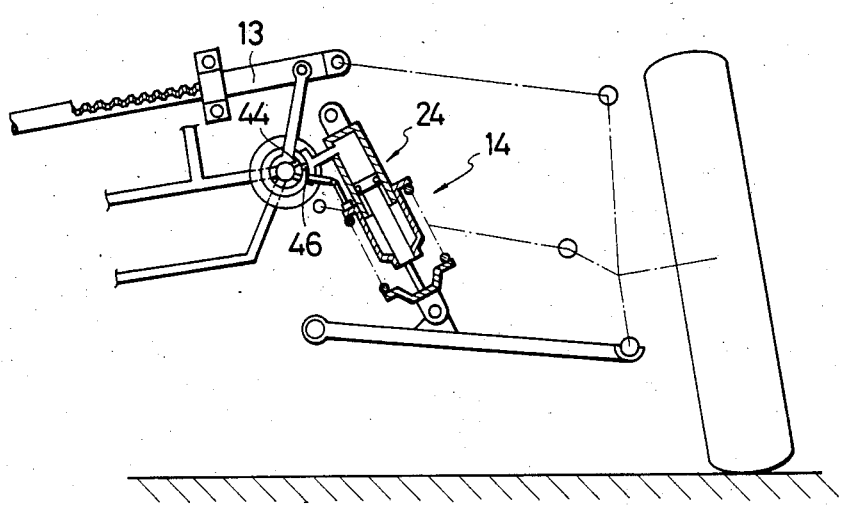

FIG. 6 illustrates one state of a left side (right side in the figure) suspension spring 14 and a rotary valve 60 at a time when a vehicle is turning rightward. When the vehicle is turning rightward, a slider 13 is moved leftward as shown by an arrow b, and an inner valve 36 connected to said slider 13 through a lever portion piece 52 is pivoted in the clockwise direction in the figure. Accordingly, the feed oil port 44, which was spaced apart from the feed oil port 46 at the time when the vehicle is running straight forward, is brought to be in alignment with the feed oil hole 46. As a result, the pressurized oil in the feed pipe 31 is fed into the cylinder 23 to push down the piston 22. In accordance with the movement of the piston 22, an outer valve 37 connected thereto through a lever portion piece 53 is pivoted in the clockwise direction. Although the feed oil hole 46 is brought to be spaced apart from the feed oil port 44, since the feed oil port 44 is also pivoted in the clockwise direction while the slider 13 is moving, the aligning state between the feed oil hole 46 and the feed oil port 44 is maintained, and the piston 22 is kept moving. In other words, the telescopic member 24 is being expanded and the entire length of the suspension spring 14 is continuously increased. When the movement of the slider 13 is stopped, as shown in FIG. 7, the feed oil hole 46 is in a spaced apart state with respect to the feed oil port 44. Accordingly, the expansion of the telescopic member 24 is stopped as well, and the entire length of the suspension spring 14 is maintained in such a length as to correspond to the moving amount of the slider 13, i.e., the steering amount.

Simultaneously, in the right side rotary valve 60, the waste oil port 45 and the waste oil hole 47 are in alignment with respect to each other. Accordingly, oil in the cylinder 23 is discharged into the return pipe 42 through the waste oil passage 43, and the outlet port 41. And in the same manner as described in the foregoing, the entire length of the suspension spring 14 is contracted corresponding to the steering amount, and the suspension spring 14 is maintained in this length.

As a result, as already described with respect to FIG. 1 and FIG. 2, the vehicle body is caused to decline rightward or toward the turning center side, and brought to be in a lean state similar to a motorcycle.

Figure 10:
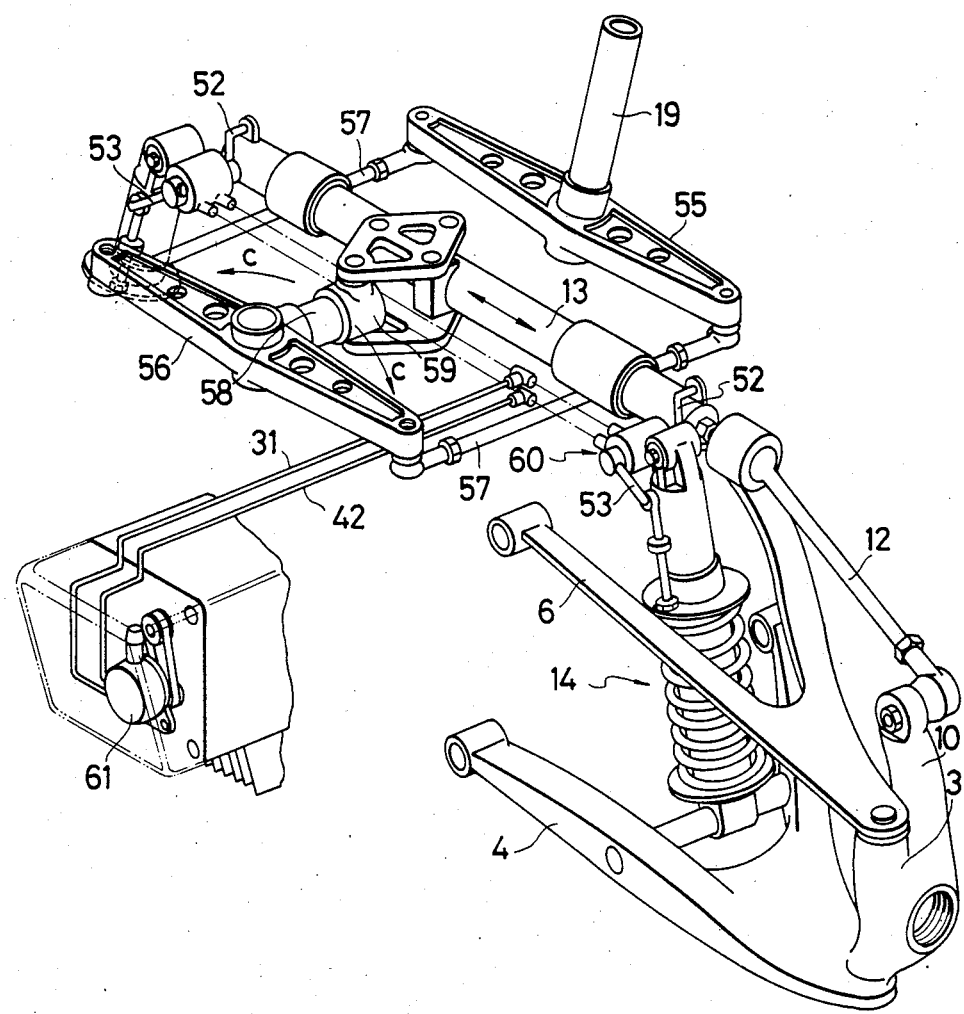
FIG. 10 is a perspective view showing a concrete constitution of a suspension apparatus.

FIG. 10 is a perspective view more realistically illustrating the structures of the above various devices, wherein like numerals denote like parts as before. In FIG. 10, the steering shaft 19 and the slider 13 are connected with respect to each other through a link mechanism instead of the rack and the pinion. More specifically, the arm 55 secured to the steering shaft 19 is connected to the arm 56 pivotally secured to the vehicle body through a link 57, and the oscillating movement as shown by an arrow c of the arm 56 is converted to a reciprocal movement of the slider 13 through the slider 59 engaged with the slide rod 58 provided on said arm 56.

The pump 61 and the reservoir tank 62 (not shown in FIG. 10) juxtaposed thereto are disposed in lower positions than the rotary valve 60, and the oil discharged from the rotary valve 60 is returned to the reservoir tank 62 by gravity through the return pipe 42. Consequently, as shown in FIG. 8 and FIG. 9, the outlet port 41 is formed larger in its diameter than that of the inlet port 39, and the return pipe 42 is constituted with tubular material also having a large bore diameter compared with that of the feed pipe 31.

In the present embodiment, although the suspension spring 14 is expanded and contracted in accordance with the movement of the slider 13, the slider 13 merely actuates the inner valve 36 of the rotary valve 60 and the reaction force of the suspension spring 14 is not transmitted to the slider 13. Instead, only reaction force which the front wheel 1 receives from the earth is transmitted to the slider 13, and this reaction force is transmitted to the steering wheel 20. Accordingly, a satisfactory steering sense can be obtained.

Although in the above respective embodiments, the present invention is applied to the double wishbone type suspension apparatus, it may also be applied to other types of suspension apparatuses. Also, instead of the steering wheel 20, a bar handle may be employed. Furthermore, the present invention may of course be applicable to other vehicles, such as automobiles than motor tricycles. As discussed in the foregoing, many other modifications can be made within the scope of the present invention.

What is claimed is:

1. A suspension apparatus for a vehicle provided between a pair of left and right wheels of the vehicle and the vehicle body, comprising
   telescopic members integrally connected to suspension springs and expanded and contracted by means of fluid pressure, fluid passages for feeding fluid pressurized by a pump to said telescopic members and discharging the fluid from said telescopic members, controlling valves provided in said fluid passages, each valve having a cylindrical inner valve member, a cylindrical outer valve member rotatably fitted on said inner valve member and a main body containing and supporting said inner and outer valve members for rotation respectively, means for connecting each said inner valve member to a steering mechanism to rotate said inner valve member in accordance with the movement of said steering mechanism, and means for connecting each said outer valve member to one of said telescopic members to rotate said outer valve member in accordance with the movement of said telescopic member relative to the vehicle body, whereby the controlling valves are connected to the steering mechanism and to said telescopic members to control said valves not only with respect to the steering but also with respect to the movement of the telescopic members relative to the vehicle body so that the vehicle body is caused to decline toward turning center side due to telescopic movement of said telescopic members in accordance with a steering operation.

2. A suspension apparatus according to claim 1, wherein said means for connecting each inner valve member to a steering mechanism is a first lever portion piece formed on said inner valve member which is directly connected to a moving bar of the steering mechanism; and wherein said means for connecting each outer valve member to one of said telescopic members is a second lever portion piece formed on said outer valve member which is directly connected to a piston side member of said one of said telescopic members.

* * * * *